United States Patent
Hariharan (10) Patent No.: US 9,788,351 B2
(45) Date of Patent: Oct. 10, 2017

(54) ESTABLISHING A BLUETOOTH CLASSIC CONNECTION USING AN EXISTING BLUETOOTH LOW ENERGY CONNECTION

(71) Applicant: Apple Inc., Cupertino, CA (US)

(72) Inventor: Sriram Hariharan, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/064,560

(22) Filed: Mar. 8, 2016

(65) Prior Publication Data

US 2016/0262193 A1 Sep. 8, 2016

Related U.S. Application Data

(60) Provisional application No. 62/129,917, filed on Mar. 8, 2015.

(51) Int. Cl.
*H04W 4/00* (2009.01)
*H04W 76/02* (2009.01)
*H04W 84/20* (2009.01)

(52) U.S. Cl.
CPC ........... *H04W 76/02* (2013.01); *H04W 4/008* (2013.01); *H04W 84/20* (2013.01); *Y02B 60/50* (2013.01)

(58) Field of Classification Search
USPC .............................................. 455/41.1, 41.2
See application file for complete search history.

(56) References Cited

U.S. PATENT DOCUMENTS

| 2005/0169201 A1* | 8/2005 | Huylebroeck | H04W 74/06 370/311 |
| 2011/0167128 A1* | 7/2011 | Raghunathan | H04W 36/02 709/217 |
| 2011/0167182 A1* | 7/2011 | Palin | H04W 48/18 710/105 |

(Continued)

OTHER PUBLICATIONS

Specification of the Bluetooth System, Covered Core Package Version: 4.0, Specification vol. 0, Master Table of contents and Compliance Requirements, Jun. 30, 2010, 106 pages.

(Continued)

*Primary Examiner* — Ganiyu A Hanidu
(74) *Attorney, Agent, or Firm* — Downey Brand LLP (57) ABSTRACT

The embodiments set forth techniques for enabling two devices to seamlessly construct/deconstruct a BTC connection on an as-needed basis. According to some embodiments, the technique involves exchanging, over a BTLE connection that exists between the two devices, information that enables the two devices to establish a BTC connection in a timely and power-efficient manner. To construct a BTC connection, a master device transmits, to a slave device using Link Layer (LL) control messages over an existing BTLE connection, clock information associated with the master device, a Logical Bluetooth Classic Transport Address (LT_ADDR) associated with the slave device, and other information. In turn, the BTC connection can be established between the master device and the slave device using the exchanged information. This technique can require less time and consume less power compared with conventional approaches that do not use existing communication channels to establish a BTC connection.

19 Claims, 8 Drawing Sheets

(56) References Cited

U.S. PATENT DOCUMENTS

| | | | |
|---|---|---|---|
| 2013/0045684 A1* | 2/2013 | Linde | H04W 80/02 |
| | | | 455/41.2 |
| 2013/0109315 A1* | 5/2013 | Polo | H04W 52/0274 |
| | | | 455/41.2 |
| 2013/0326495 A1* | 12/2013 | Reunamaki | G06F 8/65 |
| | | | 717/173 |
| 2014/0348327 A1* | 11/2014 | Linde | H04W 4/008 |
| | | | 381/2 |

OTHER PUBLICATIONS

Specification of the Bluetooth System, Covered Core Package Version: 4.0, Specification vol. 1, Architecture and Terminology Overview, Jun. 30, 2010, 140 pages.
Specification of the Bluetooth System, Covered Core Package Version: 4.0, Specification vol. 2, Core System Package [BR/EDR Controller Volume], Jun. 30, 2010, 1114 pages.
Specification of the Bluetooth System, Covered Core Package Version: 4.0, Specification vol. 3, Core System Package [Host Volume], Jun. 30, 2010, 656 pages.
Specification of the Bluetooth System, Covered Core Package Version: 4.0, Specification vol. 4, Host Controller Interface [Transport Layer], Jun. 30, 2010, 88 pages.
Specification of the Bluetooth System, Covered Core Package Version: 4.0, Specification vol. 5, Core System Package [AMP Controller Volume], Jun. 30, 2010, 60 pages.
Specification of the Bluetooth System, Covered Core Package Version: 4.0, Specification vol. 6, Core System Package [Low Energy Controller Volume], Jun. 30, 2010, 138 pages.

* cited by examiner

| OPCODE LL_CLOCK_IND (1 OCTET) | CLK SNAP INSTANT (2 OCTETS) | CLK27:2 (26 BITS) | CLK OFFSET (6 BITS) |
|---|---|---|---|

FIG. 6A

| OPCODE LL_CONNECT_CLASSIC_REQ (1 OCTET) | BD_ADDR (6 OCTETS) | CLASS OF DEVICE (3 OCTETS) | LT_ADDR (3 BITS) | RFU (5 BITS) |
|---|---|---|---|---|

FIG. 6B

| OPCODE LL_CONNECT_CLASSIC_RES (1 OCTET) | RESPONSE (1 OCTET) |
|---|---|

FIG. 6C

| OPCODE LL_VERSION_IND (1 OCTET) | SUPPORTED VERSION (1 OCTET) | SUPPORTED FEATURES BIT 0: TRANSPORT SWITCHING |
|---|---|---|

ESTABLISHING A BLUETOOTH CLASSIC CONNECTION USING AN EXISTING BLUETOOTH LOW ENERGY CONNECTION

This Application claims the benefit of U.S. Provisional Application No. 62/129,917, entitled "ESTABLISHING A BLUETOOTH CLASSIC CONNECTION USING AN EXISTING BLUETOOTH LOW ENERGY CONNECTION", filed Mar. 8, 2015, the contents of which is incorporated by reference herein in its entirety for all purposes.

FIELD

The described embodiments set forth techniques for establishing a Bluetooth® (BT) Classic connection between two devices that share an existing Bluetooth Low Energy connection.

BACKGROUND

Bluetooth Classic (BTC) and Bluetooth Low Energy (BTLE) are communication protocols that are commonly used to enable mobile computing devices to communicate with one another. BTC is a short-range wireless communications technology that operates in the 2.4 GHz industrial, scientific, and medical (ISM) band, utilizes a spread-spectrum frequency hopping scheme, and currently provides data throughput of around 2.5 Mbps. BTLE is a short-range wireless communications technology that also operates in the 2.4 GHz ISM band and provides reduced power consumption in comparison to BTC. The data throughput of BTLE, however, is substantially constrained in comparison to BTC, and is currently limited to around 100 Kbps.

Generally, a master device and a slave device exchange a number of packets to establish a Bluetooth Classic (BTC) connection or a Bluetooth Low Energy (BTLE) connection. The master device can also be referred to as a central device, while slave devices can also be referred to as peripheral devices. Typically, to set up a BTC connection, the master device continuously transmits page packets to a slave device over multiple frequencies. Each page packet includes a Device Access Code (DAC) of a slave device for which the page packet is intended. A particular slave device, in a page scan mode, scans for and isolates the page packets that include the DAC of the slave device. When the master device transmits a page packet at a particular time and frequency, and the slave device receives the page packet at the same time and frequency, then transmission by the master device and reception by the slave device of the page packet is coarsely aligned in time and in frequency hopping. In turn, the slave device transmits a page response to the master device to acknowledge receipt of the page packet. Thereafter, the master device and the slave device exchange additional packets to carry out clock synchronization and establish the BTC connection.

Notably, the BTC connection setup process can be power-intensive because the master device continuously transmits page packets to the slave device to attempt to discover the slave device. The slave device, when unpaired, remains in a page scan mode to be able to receive and acknowledge the page packets. The BTC connection setup is also time-intensive because the transmission and reception of the page packets between the master device and the slave device needs to be aligned prior to establishing the BTC connection. Typically, the BTC connection setup takes about 1-4 seconds to complete depending on a variety of factors, e.g., how quickly the devices align in time and frequency hopping to send and receive page packets and page response packets, whether the slave device is performing another task while performing the page scan or is connected to other devices over BTLE or BTC (which increases the time needed for alignment), and the like. The BTC connection setup is also bandwidth-intensive because the master device can spend a considerable amount of time using the bandwidth to transmit the page packets, which is especially significant as it impacts other high-priority bandwidth-intensive tasks (e.g., music playback) simultaneously being carried out that should not be interrupted.

SUMMARY

The embodiments set forth techniques for enabling two devices (e.g., a master device and a slave device) to seamlessly construct/deconstruct a BTC connection on an as-needed basis. Specifically, the technique involves exchanging, over an existing BTLE connection between the two devices, information that enables the two devices to establish a BTC connection in a timely and power-efficient manner. A BTC connection can provide additional features and benefits in comparison to a BTLE connection, for example, when a sizeable amount of data (e.g., greater than one megabyte (1 MB)) needs to be transferred between the master device and the slave device. To construct a BTC connection, the master device transmits, to the slave device over the existing BTLE connection, clock information associated with the master device. In turn, the slave device analyzes the clock information and synchronizes its own clock with the clock of the master device. When the clocks of both devices are synchronized, the master device transmits a BTC connection request to the slave device. According to some embodiments, the BTC connection request includes a Logical Bluetooth Classic Transport Address (LT_ADDR) of the slave device, which can be generated by the master device when establishing the BTC connection. In response to the BTC connection request, the slave device provides a BTC response that indicates whether the BTC connection request is accepted or rejected by the slave device. Accordingly, the existing BTLE connection between the two devices is opportunistically used to communicate clock information, the BTC connection request, and the BTC response for the purposes of establishing the BTC connection. This technique can provide considerable time and power savings over conventional approaches that do not use existing communication channels when establishing BTC connections.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. In some embodiments, the WPAN technology can include a Bluetooth wireless communication subsystem or radio, and the Bluetooth radio can implement one or more versions of a Bluetooth communication protocol in accordance with a present or future developed Bluetooth Special Interest Group (SIG) technology.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Establishing a BTC connection between a master device and a slave device using traditional paging mechanisms can consume a considerable amount of power. Specifically, the master device expends power to continuously page the slave device, and the slave device expends power while remaining in a page scan mode to receive paging messages from the master device. Setting up a BTC connection between the master device and the slave device using traditional paging mechanisms can also present latency issues. Specifically, the transmission and the reception of page packets must be aligned before establishing the BTC connection, which can require 1-4 seconds to complete. Consequently, unacceptable power consumption and time delays can occur when seeking to construct a BTC connection on an as-needed basis between the master device and the slave device.

To improve efficiency, when the master device and the slave device share an existing BTLE connection, the BTLE connection can be leveraged to establish a BTC connection, (e.g., when a higher throughput rate is beneficial), and reduce the above-described overhead associated with the traditional BTC paging mechanism. Some embodiments set forth a technique that enables the master device and the slave device to seamlessly establish a BTC connection using an existing BTLE connection (e.g., in accordance with fluctuating throughput requirements). To implement this technique, the existing BTLE connection between the master device and the slave device is used to exchange information that can be used to subsequently establish the BTC connection. Specifically, the master device communicates to the slave device using Link Layer (LL) control messages over the BTLE connection, the LL control messages including clock information associated with the master device, a Logical Bluetooth Classic Transport Address (LT_ADDR) associated with the slave device, and other information to facilitate establishing the BTC connection. In turn, the BTC connection can be established between the master device and the slave device using information included in the LL control messages exchanged via the BLTE connection. The BTLE connection, at the Link Layer level, can remain established in parallel with the BTC connection, while at a higher layer level, e.g., at a Transport Layer level, data can be communicated via the BTC connection rather than via the BTLE connection, e.g., when a service can benefit from the higher throughput rate provided by the BTC connection.

Accordingly, the foregoing approaches provide techniques for establishing a high-throughput BTC connection using information communicated via a low-throughput BTLE connection, allowing the devices to switch, at a transport level, between the previously established BTLE connection and the newly established BTC connection in a seamless manner. A more detailed discussion of these techniques is set forth below and described in conjunction with FIGS. 1-7, which illustrate detailed diagrams of representative systems and methods that can be used to implement these techniques.

Figure 1:
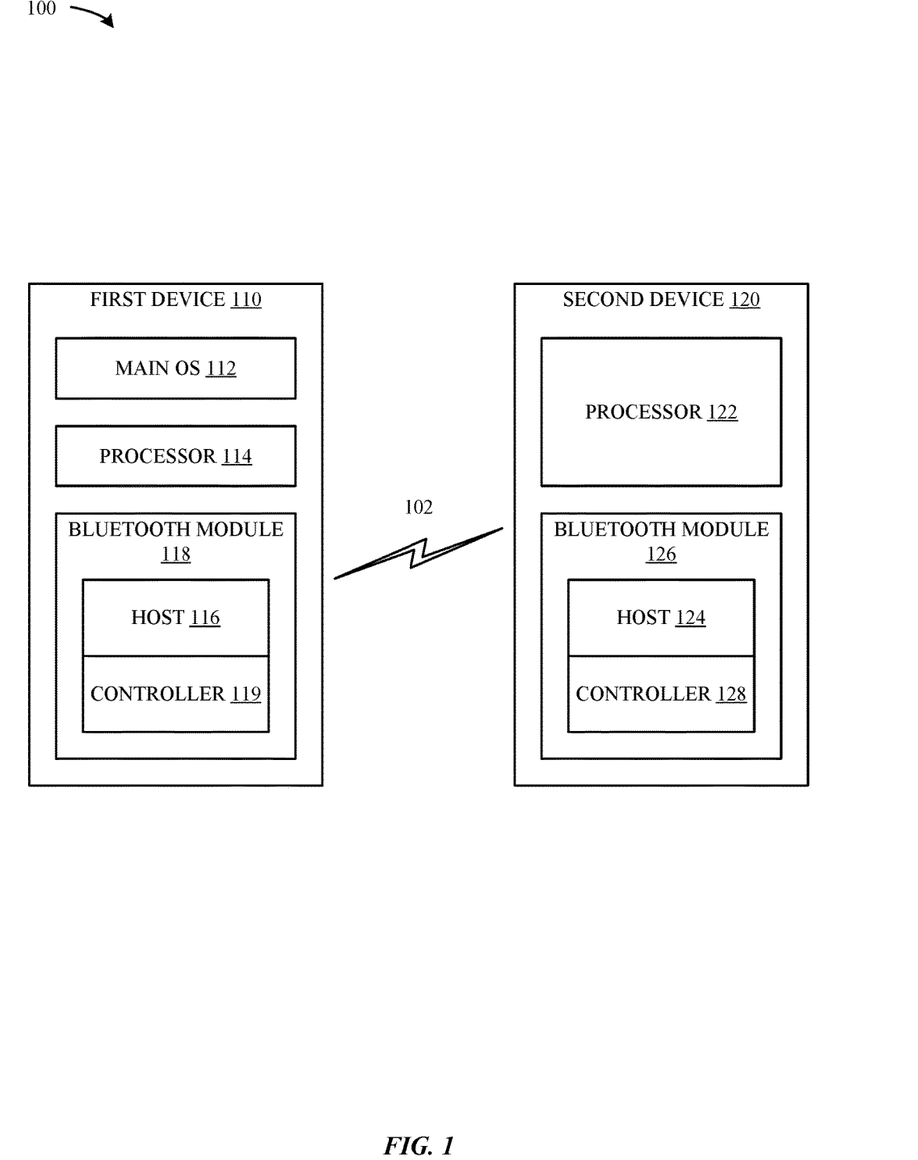
FIG. 1 illustrates a block diagram of different exemplary components that are configured to implement the various techniques described herein, according to some embodiments.

FIG. 1 illustrates a (simplified) block diagram 100 of several components of devices that can be configured to implement the various techniques described herein, according to some embodiments. FIG. 1 illustrates a high-level overview of an example system that includes a first device 110 and a second device 120. The first device 110 can represent any form of a computing device (e.g., a smartphone, a tablet, a laptop, etc.) that is capable of interfacing with other computing devices (e.g., the second device 120). According to some embodiments, the second device 120 can represent a peripheral device (e.g., fitness devices, accessory devices (e.g., a watch), remote control devices, and the like) that has low energy resources, operates for relatively long periods of time, and is capable of connecting to and communicating with the first device 110. It is noted, however, that the second device 120 is not limited to representing a peripheral device, and can represent any computing device capable of implementing the techniques described herein. As shown in FIG. 1, the first device 110 includes, among other components, a main operating system (OS) 112, a processor 114, and a Bluetooth module 118. The processor 114, in conjunction with a memory of the first device 110 (not illustrated in FIG. 1), can implement the main OS 112, which can be configured to execute various native OS applications and user applications. Similarly, the second device 120 includes, among other components, a processor 122 and a Bluetooth module 126. The first device 110 can communicate with the second device 120 via wireless communication links 102 (e.g., over BTC, BTLE, and/or other links). It will be appreciated that while FIG. 1 depicts a single second device 120 capable of wirelessly connecting to the first device 110, any number of second devices 120 can be configured to wirelessly communicate with the first device 110 without departing from the scope of this disclosure. Moreover, it will be appreciated that while FIG. 1 depicts a single second device 120 capable of wirelessly connecting to the first device 110, any number of first devices 110 can be configured to wirelessly communicate with the second device 120 without departing from the scope of this disclosure.

In some implementations, Bluetooth modules 118, 126 include respective hosts 116, 124 that represent upper layers of a BT stack. Although the embodiments described herein involve the hosts 116, 124, it is noted that the processors 114, 122 can be configured to implement the same techniques that are implemented by the hosts 116, 124, respectively. It is also noted that the hosts 116, 124 and the controllers 119, 128, respectively, can represent a single processing unit (e.g., in very low power devices). The upper layers can include the Logical Link Control and Adaptation Protocol (L2CAP), the Attribute Protocol (ATT), the Generic Attribute Profile (GATT), the Security Manager Protocol (SMP) and the Generic Access Profile (GAP), which are components of the different Bluetooth protocols supported by the Bluetooth modules 118, 126. Bluetooth modules 118, 126 also include respective controllers 119, 128 that represent the lower layers of the BT stack, such as the Physical Layer (PHY), the Link Layer (LL), and the host controller interface (HCI), which also are components of the different Bluetooth protocols supported by the Bluetooth modules 118, 126. According to some embodiments, hosts 116, 124 communicate with the controllers 119, 128 via the HCI interface. In particular, the hosts 116, 124 provide HCI commands to the Link Layer of the respective controllers 119, 128 for the purposes of establishing BTC and BTLE connections, and the Link Layers manage advertisement, scanning, and connection establishment.

As described herein, the first device 110 and the second device 120 can communicate with one another to establish a BTLE connection. Typically, the second device 120 is configured to periodically broadcast advertising packets, and the first device 110 is configured to scan for the advertising packets in accordance with specific scan windows. In particular, in response to a user request to connect the first device 110 to the second device 120, the host 116 of the first device 110 triggers the controller 119 to initiate scanning for the advertising packets associated with the second device 120, where the controller 119 identifies the second device 120 based on the BD_ADDR of the second device 120 included in the advertising packets. It is noted that the BD_ADDR of the second device 120 can be known to the first device 110 based on a prior pairing procedure performed between the first device 110 and the second device 120.

When the controller 119 detects the advertising packets from the second device 120, the controller 119 transmits a connection request to the second device 120. In response to the connection request, the second device 120 (specifically, the Bluetooth module 126 of the second device 120) can establish the BTLE connection with the first device 110 (specifically, the Bluetooth module 118 of the first device 110). When the BTLE connection is established, the first device 110 assumes the role of a master device, and the second device 120 assumes the role of a slave device. It will be appreciated that the master device can manage connections with a number of slave devices to form a BTLE network (commonly referred to as a "piconet").

The BTLE connection between the first device 110 and the second device 120 enables low-bandwidth data transfers to be carried out at a low power cost. In some cases, however, it is desirable to establish a higher-bandwidth connection—specifically, a BTC connection—between the first device 110 and the second device 120. For example, while the BTLE connection can be used to exchange small amounts of data rapidly (e.g., weather information, heart rate monitor information, etc.), exchanging large amounts of data (e.g., photos, videos, etc.) over the BTLE connection can consume a considerable amount of power and create latency bottlenecks. In this context, it is desirable to switch data transport between the BTLE connection and a BTC connection in order to establish a higher-throughput connection. Notably, it can also be desirable to enable this data transport switching to occur frequently and on an as-needed basis, e.g., to meet fluctuating data transfer requirements between the first device 110 and the second device 120 throughout the day. To satisfy these requirements, the embodiments set forth techniques that involve leveraging the existing BTLE connection to establish a BTC connection in a more power efficient and time efficient manner. Moreover, by utilizing the existing BTLE connection to establish the BTC connection, the piconet relationship—that is, the established master device and the established slave device—can remain intact within the contexts of the BTLE connection and the BTC connection. Thus, in some embodiments, both a BTLE connection and a BTC connection can exist in parallel, with data transported on the BTC connection or the BTLE connection as appropriate.

Figure 2:
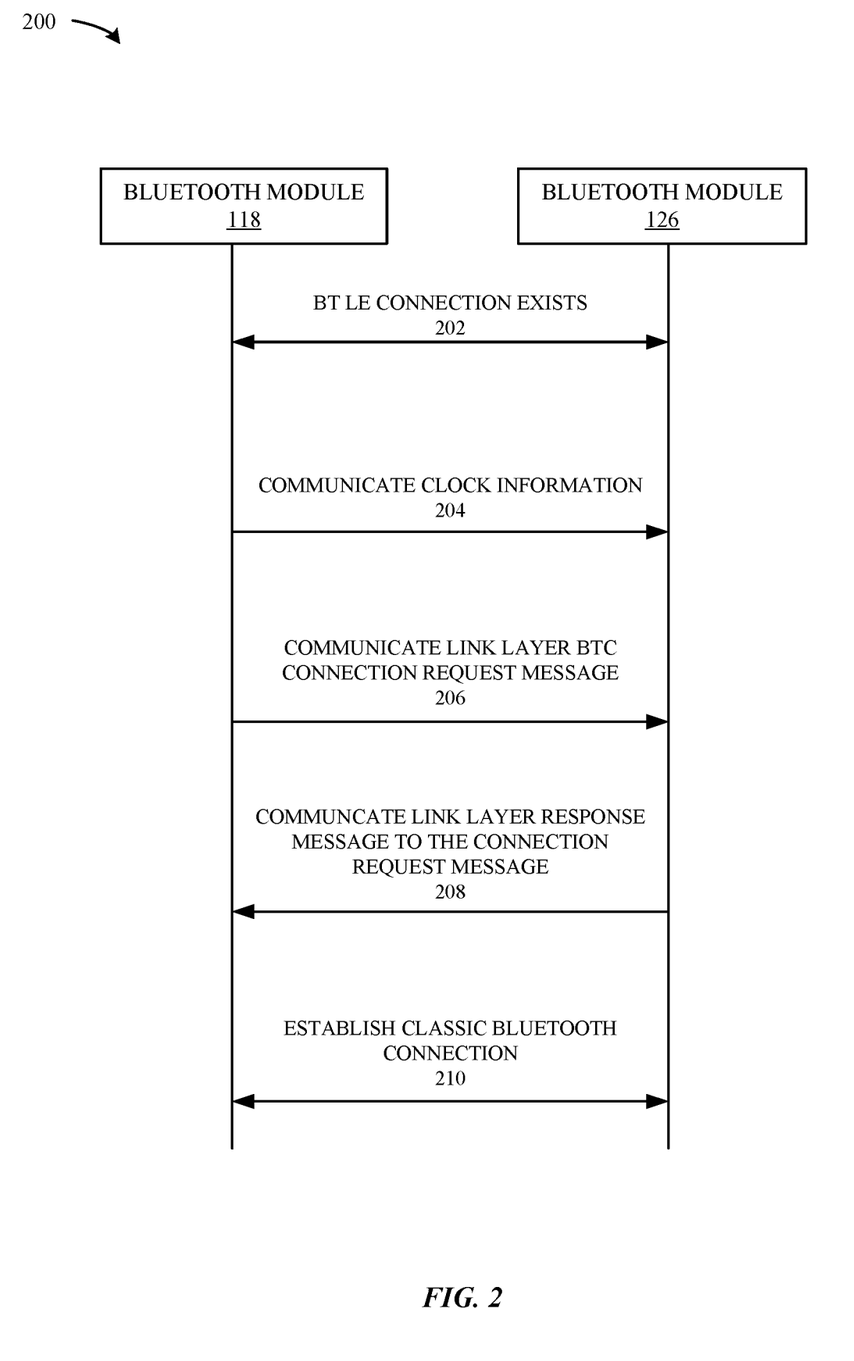
FIG. 2 illustrates a high-level sequence diagram of example operations that are performed when establishing a BTC connection between two devices illustrated in FIG. 1, according to some embodiments.

FIG. 2 illustrates a high-level sequence diagram 200 of operations performed in order to establish a BTC connection between the first device 110 and the second device 120, according to some embodiments. As shown in FIG. 2, during an operation 202, a BTLE connection exists between the Bluetooth module 118 (of the first device 110) and Bluetooth module 126 (of the second device 120). To maintain the BTLE connection, the Bluetooth modules 118, 126 can exchange empty packets at particular connection intervals to indicate that the BTLE connection is still alive. At some point, the main OS 112 of the first device 110 can determine that a higher throughput connection is required, e.g., based on large amounts of data being exchanged between the first device 110 and the second device 120. Based on the determination, the main OS 112 can trigger the Bluetooth module 118 to initiate a BTC connection procedure—specifically, to initiate a transport switching procedure where a BTC connection is established in parallel with the existing BTLE connection, e.g., to provide a higher throughput connection for data transport. At operation 204, the Bluetooth module 118 communicates clock information associated with the first device 110 to the Bluetooth module 126. The clock information can be communicated via a Link Layer (LL) control message. The second device 120 then synchronizes its clock based on the clock information communicated by the first device 110.

At operation 206, the Bluetooth module 118 of the first device 110 communicates, to the Bluetooth module 126 of the second device 120, an LL BTC connection request message that represents a request to switch from the BTLE connection to a BTC connection, e.g., to establish a parallel BTC connection over which to transport data. The LL BTC connection request message includes a logical Bluetooth Classic transport address (LT_ADDR) of the second device 120. At operation 208, the Bluetooth module 126 responds to the LL BTC connection request message with an LL BTC response message that indicates whether the LL BTC connection request is accepted or rejected by the second device 120. When the LL BTC response from the Bluetooth module 126 indicates that the LL BTC connection request is accepted, the BTC connection is established between the first device 110 and the second device 120, at operation 210.

Accordingly, the foregoing techniques involve using an existing BTLE connection to establish a BTC connection through an exchange of LL control messages over the BTLE connection, which can enhance overall efficiency compared to a traditional paging mechanism approach. The foregoing techniques can reduce a time to establish the BT connection and require less power consumption than when using a regular BTC establishment procedure.

Figure 3:
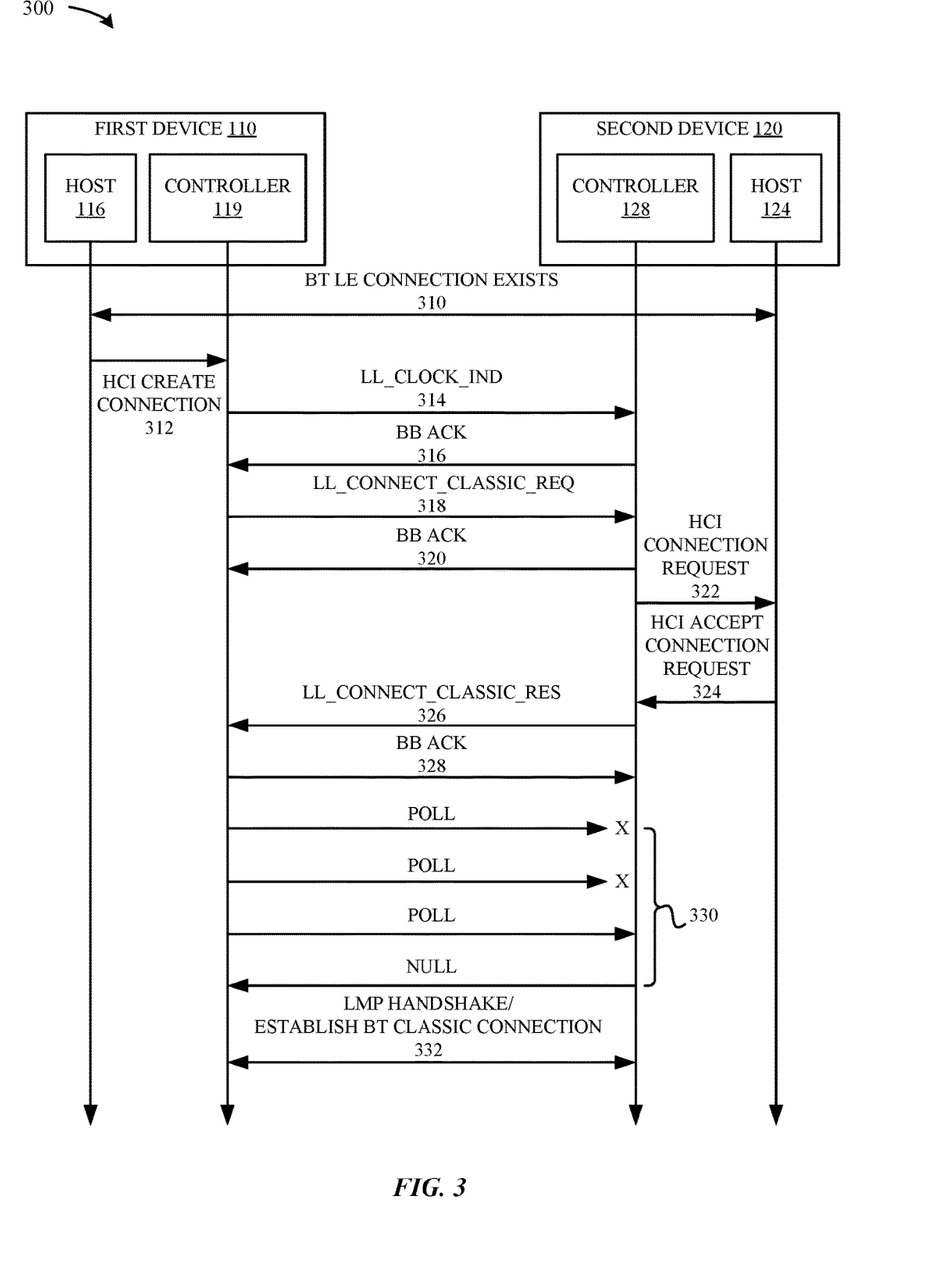
FIG. 3 illustrates an example low-level sequence diagram of the operations of FIG. 2, according to some embodiments.

FIG. 3 illustrates a low-level sequence diagram 300 of a set of operations that relate to the operations described above in conjunction with FIG. 2, according to some embodiments. As shown in FIG. 3, during an operation 310, a BTLE connection exists between the first device 110 and the second device 120. At an operation 312, the host 116 of the first device 110 initiates a transport switching procedure. In particular, the host 116 communicates a BTC connection request to the controller 119 via the HCI interface using HCl commands. In some embodiments, when the first device 110 and the second device 120 have public addresses, such as Bluetooth addresses (BD_ADDR's) the host 116 can provide the public BD_ADDR of the second device 120 to the controller 119, where the controller 119 uses the public BD_ADDR to initiate the transport switching procedure with the second device 120. In some embodiments, the second device 120 periodically updates a device address (which can be referred to as a resolvable private address (RPA)) associated with the second device 120. During the pairing procedure, the second device 120 distributes, to the first device 110, an identity resolving key (IRK) associated with the second device 120. The IRK can be used by the first device 110 to resolve the RPA associated with the second device 120. In some embodiments, the host 116 is aware of the public address (e.g., the BD_ADDR) of the second device 120. The controller 119 identifies the BD_ADDR as the public address associated with an existing BTLE link based on the IRK keys distributed by the host 116 to the controller 119, and subsequently initiates the transport switching procedure. In particular, the controller 119 uses the IRK keys to resolve the RPA associated with the second device 120 to determine whether the RPA maps to the BD_ADDR. In the event that the first device 110 and the second device 120 have not been paired, the host 116 can use the RPA of the second device 120 and the controller 119 to initiate the transport switching procedure.

Figure 6A:
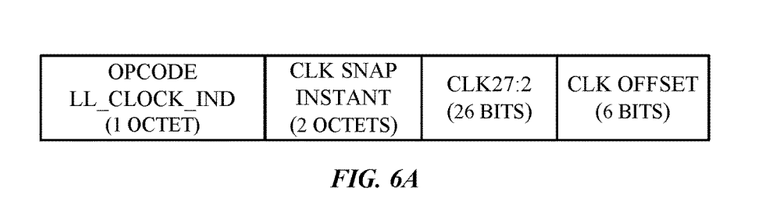
FIGS. 6A-6D illustrate exemplary structures for protocol data units exchanged between two devices illustrated in FIG. 1, according to some embodiments.

At an operation 314, in response to the BTC connection request, the controller 119 transmits the clock information of the first device 110 to the second device 120 (specifically, to the controller 128 of second device 120). The clock information can be communicated, for example, using a LL control message or LL protocol data unit (LL PDU), which can be referred to as an LL_CLOCK_IND PDU and is depicted in FIG. 6A and described in greater detail further herein. The LL_CLOCK_IND PDU includes a snapshot of a piconet clock of the first device 110 at a start of a connection event. Specifically, a connection event indicates a time period for which data packets are exchanged between the first device 110 and the second device 120. For example, a connection event can begin when the first device 110 transmits a data packet and ends when the first device 110 and the second device 120 complete their data exchanges. FIG. 6A shows an exemplary format for a LL_CLOCK_IND PDU that includes, among other information, an event counter value at which real time clock information is snapped (which can be referred to as a clock (CLK) snap instant). The LL_CLOCK_IND PDU also includes a "snapshot" (value) of a 26-bit real-time piconet clock of the first device 110 (labeled in FIG. 6A as $CLK_{27:2}$). In some cases, $CLK_{27:2}$ has a resolution of 1.25 ms—specifically, $CLK_{27:2}$ has two slot intervals. According to some embodiments, the clock value ($CLK_{27:2}$) is identical to the clock information carried in a frequency hopping synchronization (FHS) packet. When the clock is snapped at a start of a BTC frame, $CLK_{0:1}$ is "0" and does not need to be transmitted. The LL_CLOCK_IND PDU also includes a clock offset that indicates an offset from the start of the BTC frame, where the clock offset is included when the $CLK_{27:2}$ value is not snapped at the start of the BTC frame. According to some embodiments, the clock offset parameter can be segmented into particular units, e.g., 20 us, which is set to "0" when the $CLK_{27:2}$ value is snapped at the start of the BTC frame.

Referring back to FIG. 3, at an operation 316, the second device 120 (specifically, the controller 128) acknowledges the LL_CLOCK_IND PDU by sending a Baseband Acknowledgement (BB ACK) message to the first device 110. Subsequently, the second device 120 uses the clock information contained in the LL_CLOCK_IND PDU to adjust its own piconet clock. This adjustment to the piconet clock of the second device 120, based on clock information provided by the first device 110, can ensure that the first device 110 and the second device 120 have the same reference clock and are phase-aligned (i.e., bits 1:0), thereby rendering the BTLE link (with this added clock information communicated between the devices) similar to a BTC link (i.e., 27:0 bit aligned). In some embodiments, when the LL_CLOCK_IND PDU is received by the controller 128 after several retransmissions, the second device 120 can calculate the current piconet clock of the first device 110 based on a combination of a connection interval (e.g., the amount of time between two connection events), the clock snap instant, and the $CLK_{27:2}$ value.

Figure 6B:
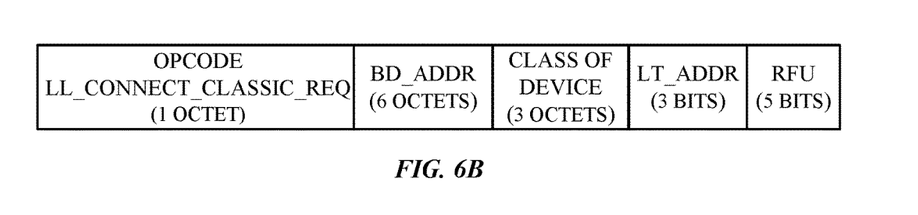

When the piconet clocks of the first device 110 and the second device 120 are aligned, an operation 318 occurs, where the controller 119 transmits an LL BTC connection request to the controller 128 to establish a new LL BTC connection in parallel with the existing LL BTLE connection. The LL BTC connection request is communicated using a LL control message or LL PDU (referred to as LL_CONNECT_CLASSIC_REQ), a representative format of which is depicted in FIG. 6B. As shown in FIG. 6B, the LL_CONNECT_CLASSIC_REQ PDU includes the BD_ADDR associated with the first device 110, a "Class of Device" (associated with the first device 110, and an LT_ADDR associated with the second device 120. The BD_ADDR represents a 48-bit field that is used when forming the BTC connection. The Class of Device represents a 24-bit field whose value identifies a Class of Device of the device sending the LL_CONNECT_CLASSIC_REQ PDU. In some implementations, the host 116 configures the Class of Device using a "write class of device" HCl command. However, when the Class of Device is not set by host 116, the controller 119 sets the 24-bit Class of Device to a value of "0". Finally, the LT_ADDR represents a logical BTC transport address of the second device 120.

Figure 6C:
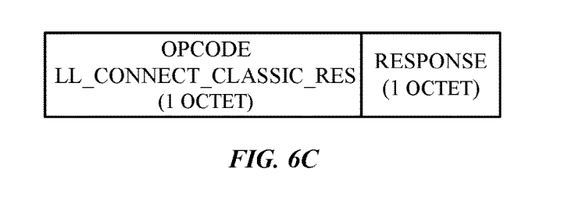

Referring back to FIG. 3, at an operation 320, the second device 120 (specifically, the controller 128) acknowledges the LL_CONNECT_CLASSIC_REQ PDU with a BB ACK. At an operation 322, the controller 128 informs the host 124 of an incoming LL BTC connection request and waits for a response from the host 124. In other embodiments, the controller 128 can auto-accept the connection request and indicate to the host 124 that the BTC connection is established. In some embodiments, the controller 128 uses the BD_ADDR and the Class of Device information included in the LL_CONNECT_CLASSIC_REQ PDU to form an HCI connection request directed to the host 124. At an operation 324, host 124 provides a response to accept or reject the LL connection request. In some embodiments, the controller 128 uses the BD_ADDR from the LL_CONNECT_CLASSIC_REQ PDU to calculate a channel access code (CAC) for the BTC link. At an operation 326, the controller 128 transmits, to the controller 119, an LL control message or an LL PDU (referred to as LL_CONNECT_CLASSIC_RES). The LL_CONNECT_CLASSIC_RES PDU, as shown in FIG. 6C, includes a response parameter that indicates a response from host 124 to accept or reject the BTC connection request. The response parameter is either "0" or "1" and indicates that the connection is rejected or accepted, respectively. Referring back to FIG. 3, the operation 324 indicates that the host 124 has accepted the connection request and the LL_CONNECT_CLASSIC_RES PDU, and an operation 326 includes a response parameter "1"implying that the connection is accepted. At an operation 328, the controller 119 acknowledges the LL_CONNECT_CLASSIC_RES PDU with a BB ACK. In some embodiments, the controller 119 acknowledges the LL_CONNECT_CLASSIC_RES PDU with an empty L2CAP packet.

In some embodiments, the controller 128 of the second device 120 informs the host 124 of the incoming BTC connection request with role switch disabled, which means that the first device 110 would assume the role of master device for the BTC connection as was the case for the BTLE connection. In some other embodiments, role switch may be enabled, thereby allowing the second device 120 to accept the connection request, and provide its clock information back to the first device. The second device 120 can then assume the role of master device instead of the first device 110 for the subsequent BTC connection. For example, when the second device 120 serves the role of master device and is connected to several different slave devices, it can be undesirable for the second device 120 to periodically switch from serving as a master device for existing BTLE and BTC connections to serving as a slave device for a BTC connection, as this can reduce the available bandwidth to the other slave devices.

In some embodiments, after the LL_CONNECT_CLASSIC_RES PDU has been acknowledged, the piconet clocks of the first device 110 and the second device 120 are aligned. The first device 110 and the second device 120 share an awareness of a channel access code to use for the BTC connection. At an operation 330, the controller 119 of the first device 110 transmits POLL packets to the second device 120, and the controller 128 of the second device 120 responds with a NULL packet to complete the BTC connection setup. Once the POLL/NULL packets have been exchanged between the first device 110 and the second device 120, the BTC connection is established, which is reflected by an operation 332. In some implementations, the complete BTC connection setup can take about two hundred to three hundred milliseconds to complete (as opposed to the about one to four seconds using "traditional" approaches), thereby providing considerable enhancements.

A number of subsequent Link Manager Protocol (LMP) exchanges can be performed for the established BTC connection. The LMP exchanges can include exchange of feature requirements, version requirements, packet types, channel maps, encryption modes, etc. The host 116 of the first device 110 and the host 124 of the second device 120 are informed of completion of the BTC connection setup. At this point, both the newly established BTC connection and existing BTLE connection are up and running, where either the host 116 of the first device 110 or the host 124 of the second device 120 can choose to disconnect the BTLE connection, or keep the BTLE connection alive, e.g., to be used for control channel traffic. Notably, in some embodiments, the LMP exchanges, which take about one hundred milliseconds to complete, can also be compressed into fewer exchanges, thereby further speeding up the BTC connection setup. Furthermore, while FIG. 3 depicts that the controller 119 of the first device 110 transmits the LL_CLOCK_IND PDU in response to receipt of the BTC connection request (from the host 116), the LL_CLOCK_IND PDU can be transmitted by the controller 119 of the first device 110 to the second device 120 at any time after receipt of the BTC connection request from the host 116 and before the POLL/ NULL handshake completes.

To summarize the techniques described above in conjunction with FIG. 3, the main OS 112 of the first device 110 determines that transport switching from the BTLE connection to the BTC connection is desirable, e.g., based on throughput requirements and/or other factors (e.g., available battery power, etc.). When the main OS 112 of the first device 110 determines that transport switching from BTLE to BTC is desirable, the main OS 112 triggers the Bluetooth module 118 to initiate the transport switching procedure. The host 116 of the first device 110 issues a command to the controller 119 of the first device 110 to establish a BTC connection with the second device 120 (having a public address BD_ADDR). The controller 119 of the first device resolves the RPA of each device (including the second device 120) that is paired to the first device 110 using IRK keys to determine whether the paired device maps to the BD_ADDR of the second device 120. The controller 119 of the first device 110 can check whether the second device 120 supports transport switching. In response to a determination that the RPA maps to the BD_ADDR and/or transport switching is supported, the controller 119 of the first device 110 can initiate the transport switching procedure, where a number of LL control messages/PDUs (e.g., LL_CLOCK_IND, LL_CONNECT_CLASSIC_REQ, LL_CONNECT_CLASSIC_RES) are exchanged with the second device 120 to establish the BTC connection. In some cases, when the main OS 112 of the first device 110 is aware that both the first device 110 and the second device 120 support transport switching, the main OS 112 of the first device 110 can issue a direct command to the second device 120 to initiate the transport switching procedure.

Figure 6D:
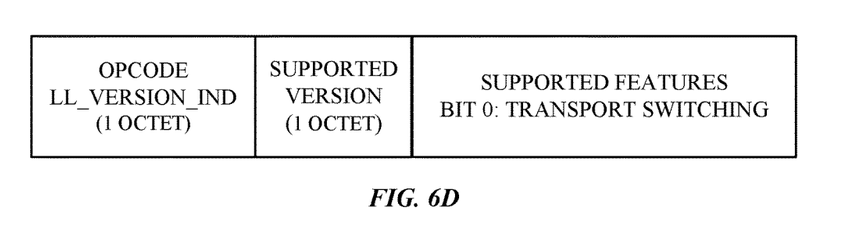

In some embodiments, when a BTLE connection is established (for example, at operation 310), the controller 119 of the first device 110 transmits an LL control message or an LL PDU referred to as LL_VERSION_IND to the controller 128 of the second device. As shown in FIG. 6D, the LL_VERSION_IND PDU can include a list of features supported by the first device 110, e.g., transport switching (switching data transport from BTLE to BTC). Similarly, the controller 128 of the second device 120 can transmit an LL_VERSION_IND PDU to the controller 119 of the first device 110, the LL_VERSION_IND PDU including manufacturer information for the second device 120, and a list of features supported by the second device 120. In some embodiments, the controllers 119, 128 exchange LL_VERSION_IND PDUs to determine whether they share a common manufacturer, such that a transport switching feature can likely be used when a BTLE link is already established between the first device 110 and the second device 120.

Figure 4A:
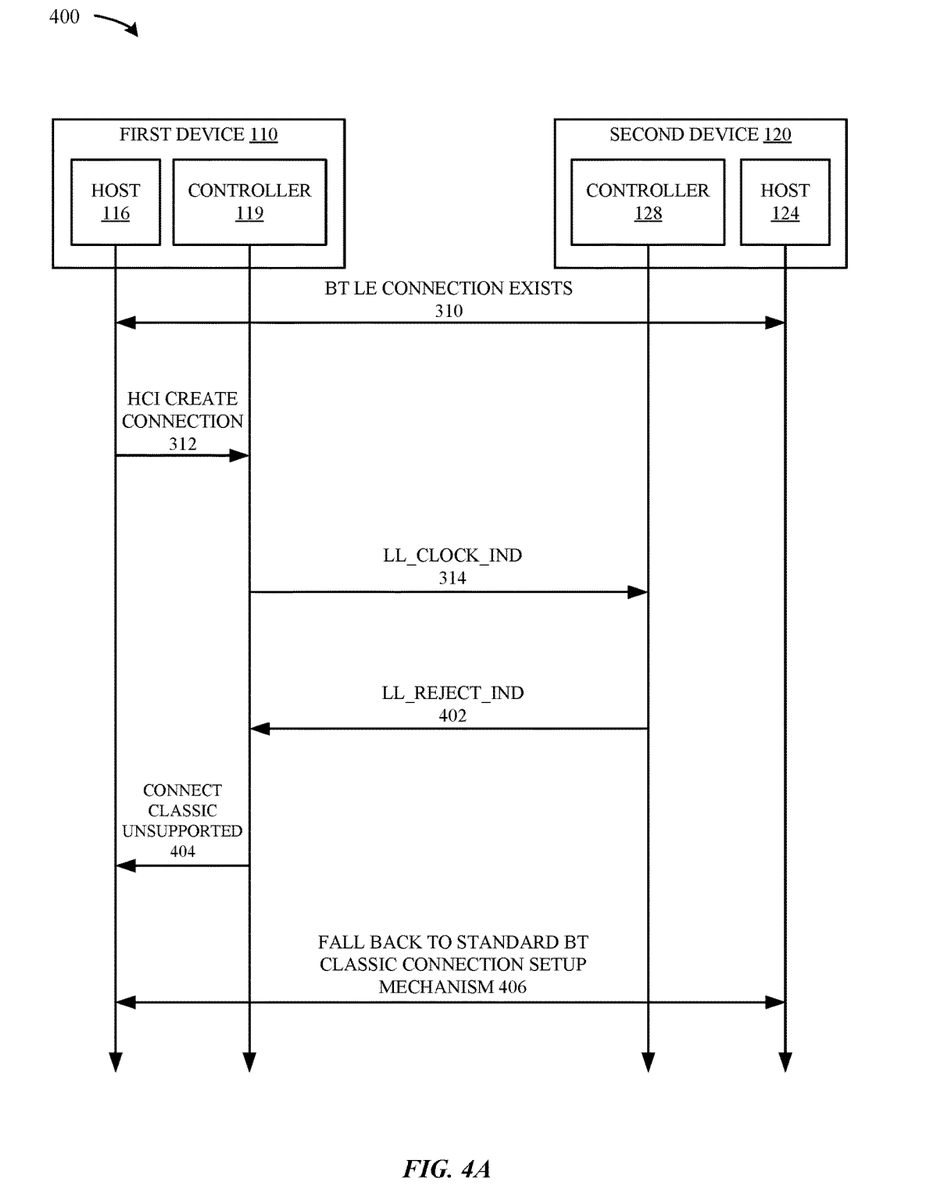
FIGS. 4A-4B illustrate an example low-level sequence of operations carried out when performing a fallback operation on a BTC paging mechanism, according to some embodiments.

In some implementations, when a particular feature (e.g., transport switching) is unsupported by a particular device (e.g., the second device 120), the device can reject one or more PDUs instead of acknowledging them. FIG. 4A illustrates an example low-level sequence diagram 400 of operations performed to "fall back" to using a "traditional" BTC paging mechanism when, for example, transport switching is not supported by the second device 120. For example, in response to receipt of the BTC connection request from host 116, the controller 119 of the first device 110 transmits the LL_CLOCK_IND PDU to the controller 128 of the second device (by way of operations 310, 312, and 314). At an operation 402, the controller 128 of the second device 120 transmits an LL_REJECT_IND PDU to the controller 119 of the first device, the LL_REJECT_IND PDU including an error code set to indicate that the transport switching feature is not supported (e.g., "Unsupported remote feature/Unsupported LMP feature"). In turn, at an operation 404, the controller 119 of the first device 110 indicates to the host 116 that transport switching is unavailable or unsupported. In this scenario, and at an operation 406, the two devices fall back to a standard BTC paging mechanism for BTC connection setup as transport switching from BTLE to BTC is not supported. Notably, when the controller 128 of the second device 120 has page scanning enabled, the host 116 of the first device 110 can optionally send an L2CAP message to the host 124 of the second device 120 to modify its page scan intervals to minimize BTC connection setup time in comparison to traditional approaches.

Figure 4B:
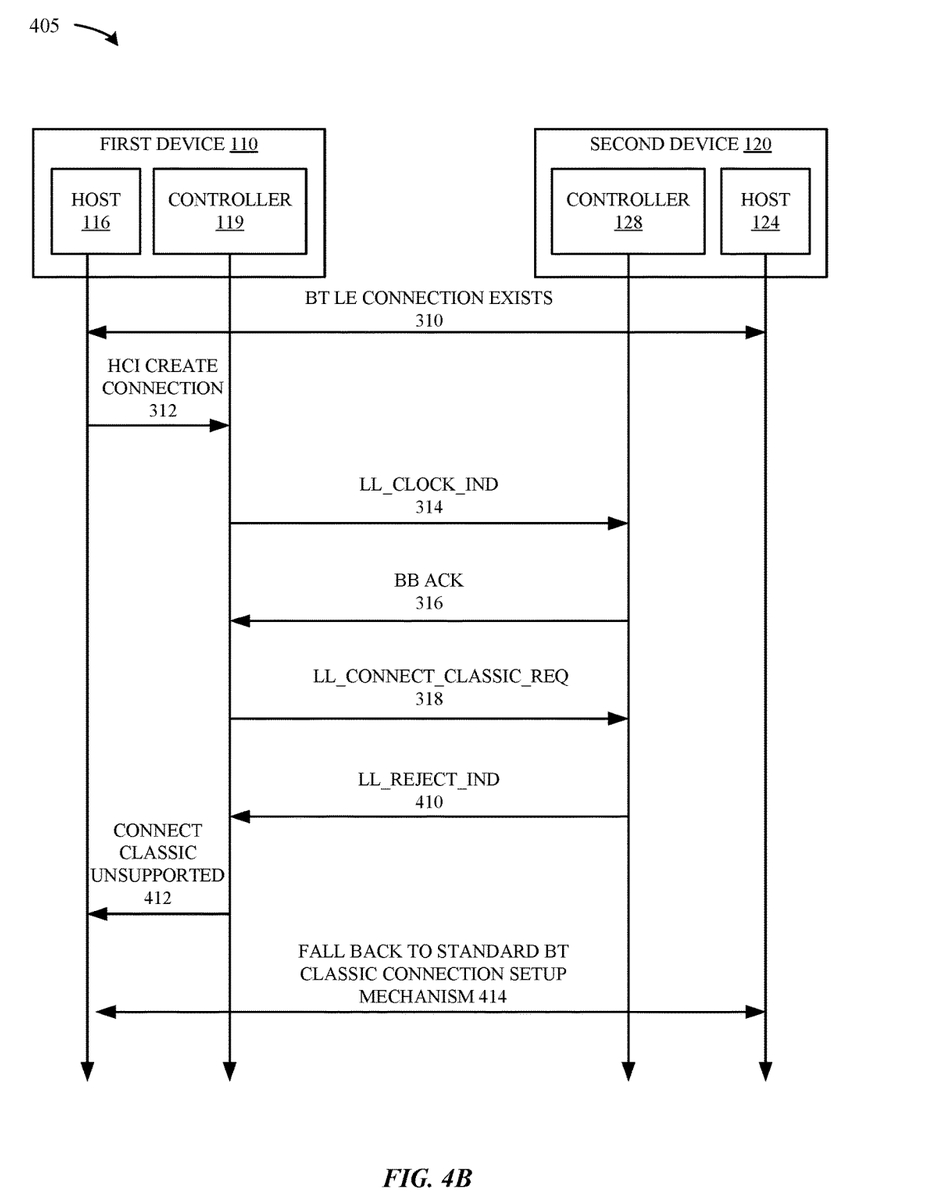

FIG. 4B illustrates another example low-level sequence diagram 405 of operations performed to "fall back" to using a "traditional" BTC paging mechanism when a particular feature, such as transport switching, is unsupported by the second device 120. In this scenario, at an operation 410, the controller 128 of the second device 120 transmits an LL_REJECT_IND PDU to the controller 119 of the first device 110, the LL_REJECT_IND PDU including an error code (e.g., "Unsupported remote feature/Unsupported LMP feature") in response to the LL_CONNECT_CLASSIC_REQ PDU received from the first device 110. In turn, at an operation 412, the controller 119 of the first device 110 indicates to the host 116 that transport switching is unavailable or unsupported, whereupon, at an operation 414, each of the first device 110 and the second device 120 fall back to a "standard" BTC paging mechanism to form a BTC connection between the first device 110 and the second device 120. If the "standard" BTC paging mechanism or the BTLE to BTC transport switching mechanism fails (after a number of tries), the controller 119 of the first device 110 can terminate the attempt to establish a BTC connection with the second device 120, and can indicate the failure through a connection complete event having a page time out error code.

Figure 5:
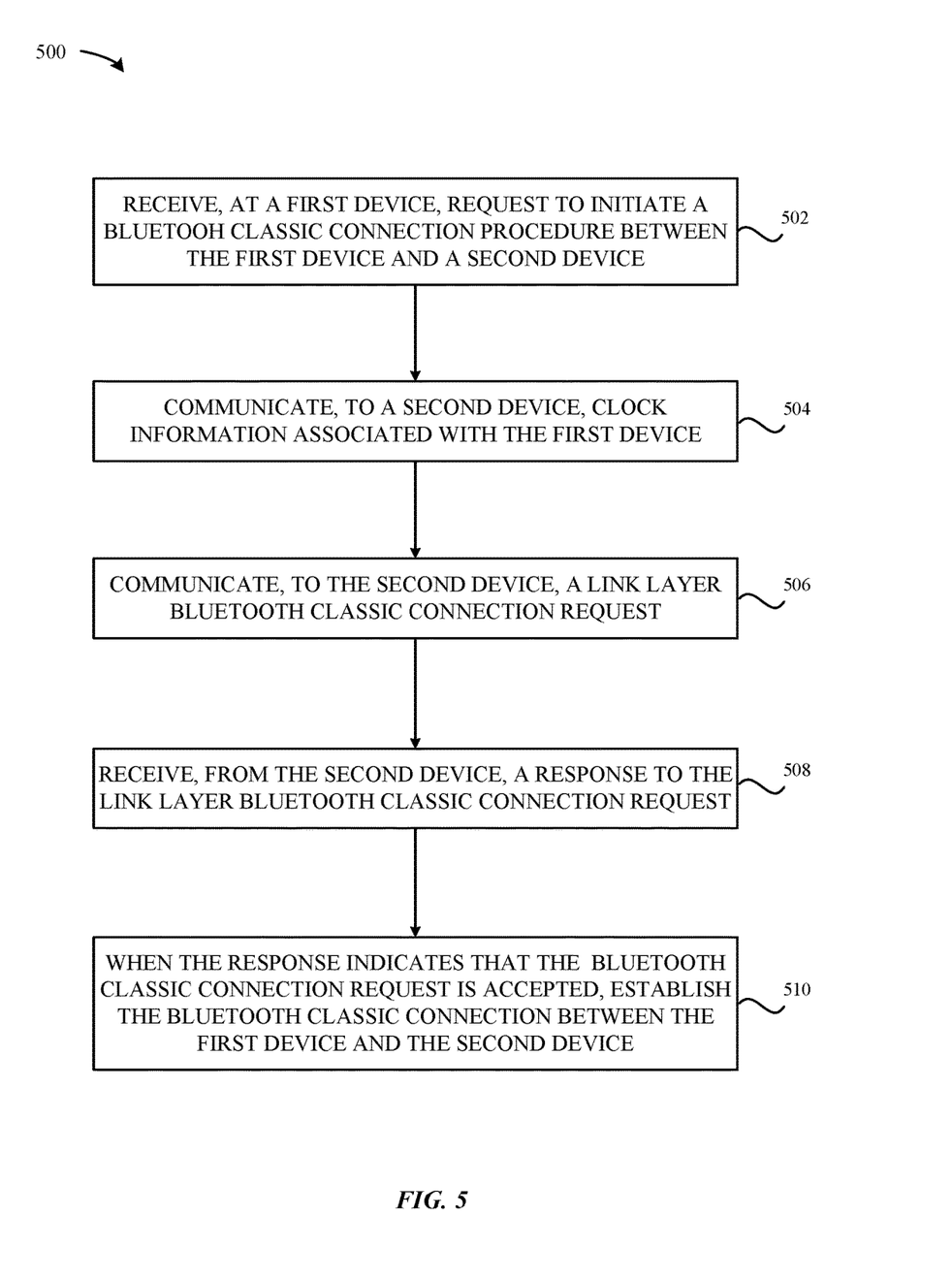
FIG. 5 illustrates a flowchart of an example method for establishing a BTC connection between two devices illustrated in FIG. 1, according to some embodiments.

FIG. 5 illustrates a flowchart 500 of a method for establishing a BTC connection between two devices, (e.g., between the first device 110 and the second device 120 of FIG. 1), using a BTLE connection that is active between the two devices. As shown in FIG. 5, the method begins at step 502, where a request to initiate a BTC connection procedure is received at the first device 110. In some embodiments, the main OS 112 determines that a higher throughput connection is required, and causes the Bluetooth module 118 of the first device 110 to initiate the BTC connection procedure. In particular, the host 116 of the first device 110 communicates, to the controller 119, a request to initiate the BTC connection procedure. At step 504, the first device 110 communicates its clock information to the second device 120. In particular, the Bluetooth module 118 of the first device 110 communicates clock information associated with the first device 110 to the Bluetooth module 126 of the second device 120. The clock information can be communicated using the LL_CLOCK_IND PDU, e.g., as described above in detail.

The second device 120 then synchronizes its clock in accordance with the clock information from the first device 110.

At step 506, the first device 110 communicates an LL BTC connection request message (e.g., LL_CONNECT_CLASSIC_REQ PDU) to the second device 120. In particular, the Bluetooth module 118 of the first device 110 communicates the LL BTC connection request message to the Bluetooth module 126 of the second device 120. At step 508, the first device 110 receives a response, (e.g., LL_CONNECT_CLASSIC_RES PDU), to the LL BTC connection request message from the second device 120. At step 510, when the response provided to the first device 110 indicates that the LL BTC connection request is accepted by the second device 120, the BTC connection is established between the first device 110 and the second device 120.

Figure 7:
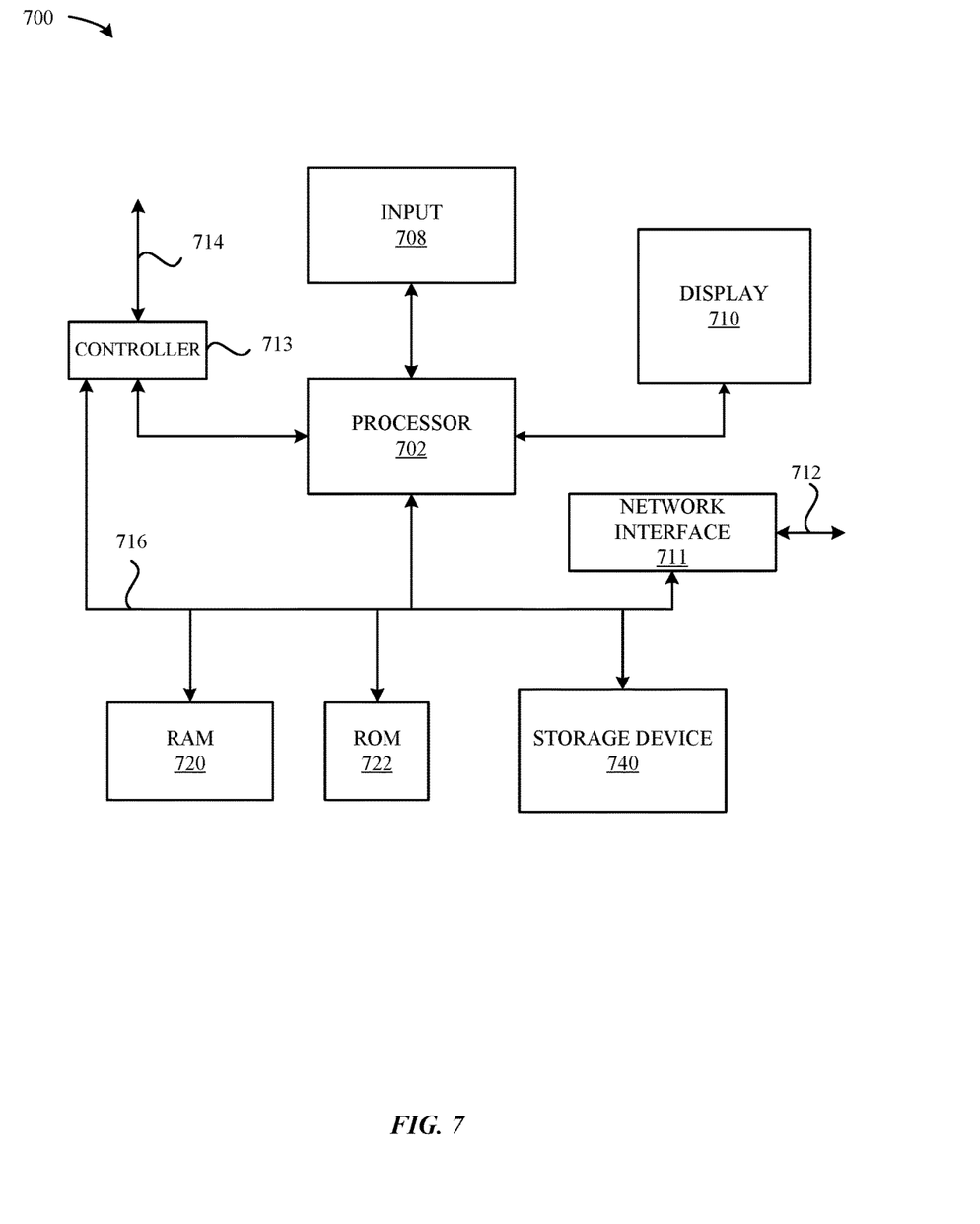
FIG. 7 illustrates a detailed view of a representative computing device that can be used to implement the various components described herein, according to some embodiments.

FIG. 7 illustrates a detailed view of a computing device 700 that can be used to implement the various components described herein, according to some embodiments. In particular, the detailed view illustrates various components that can be included in the devices 110, 120 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or a plurality of disks (e.g., hard drives), and includes a storage management module that manages one or more partitions within the storage device 740. In some embodiments, the storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

The various aspects, embodiments, implementations or features of the described embodiments can be used separately or in any combination. Various aspects of the described embodiments can be implemented by software, hardware, or a combination of hardware and software. The described embodiments can also be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a first computing device to establish a Bluetooth Classic (BTC) connection with a second computing device, the method comprising:
by the first computing device:
detecting a trigger to establish a BTC connection with the second computing device, wherein a Bluetooth Low Energy (BTLE) connection exists between the first computing device and the second computing device; and
in response to the trigger:
communicating, to the second computing device via the BTLE connection, clock information associated with the first computing device,
communicating, to the second computing device via the BTLE connection, a link layer (LL) BTC connection request,
receiving, from the second computing device via the BTLE connection, a LL BTC response indicating whether the LL BTC connection request is accepted by the second computing device,
when the LL BTC connection request is accepted by the second computing device, establishing the BTC connection with the second computing device, and
in response to a determination that switching data transport from the BTLE connection to the BTC connection is not supported, using a BTC paging mechanism to establish the BTC connection.

2. The method of claim 1, wherein the trigger to establish the BTC connection is generated in response to a determination that the BTC connection with a higher throughput than the BTLE connection is needed.

3. The method of claim 1, wherein the clock information comprises a real-time piconet clock value of the first computing device.

4. The method of claim 1, wherein the LL BTC connection request comprises a Bluetooth address (BD_ADDR) associated with the first computing device and a logical Bluetooth Classic transport address (LT_ADDR) associated with the second computing device.

5. The method of claim 1, wherein the first computing device determines that switching data transport from the BTLE connection to the BTC connection is not supported based at least in part on receipt of a LL rejection message from the second computing device, the LL rejection message indicating that transport switching is not supported.

6. The method of claim 1, further comprising:
by the first computing device:
in response to the determination that switching from the BTLE connection to the BTC connection is not supported, sending a Logical Link Control and Adaptation Protocol (L2CAP) message to the second computing device to modify page scan intervals to minimize BTC connection setup time.

7. A method for enabling a second computing device to establish a Bluetooth Classic (BTC) connection with a first computing device, the method comprising:
by the second computing device that has an existing Bluetooth Low Energy (BTLE) connection with the first computing device:
receiving, from the first computing device via the BTLE connection, clock information associated with the first computing device;
receiving, from the first computing device via the BTLE connection, a link layer (LL) BTC connection request;
when establishment of the BTC connection from the BTLE connection is supported by the second computing device:
transmitting, to the first computing device and over the BTLE connection, a LL BTC response indicating that the LL BTC connection request is accepted by the second computing device; and
establishing the BTC connection with the first computing device; and
when establishment of the BTC connection from the BTLE connection is not supported by the second computing device:
communicating, to the first computing device via the BTLE connection, a message indicating that establishing the BTC connection is unsupported.

8. The method of claim 7, further comprising:
by the second computing device:
synchronizing a piconet clock associated with the second computing device based on the clock information received from the first computing device, wherein the clock information comprises a real-time piconet clock value of the first computing device.

9. The method of claim 7, wherein the LL BTC connection request comprises a Bluetooth address (BD_ADDR) associated with the first computing device and a logical Bluetooth Classic transport address (LT_ADDR) associated with the second computing device.

10. The method of claim 9, further comprising:
by the second computing device:
determining a channel access code (CAC) for the BTC connection based on the BD_ADDR.

11. The method of claim 7, wherein the message indicating that establishing the BTC connection is unsupported comprises a LL rejection message.

12. The method of claim 7, further comprising:
by the second computing device:
in response to receipt of a Logical Link Control and Adaption Protocol (L2CAP) message from the first computing device, modifying page scan intervals to minimize BTC connection setup time using a BTC paging mechanism to establish the BTC connection.

13. The method of claim 7, further comprising:
by the second computing device:
communicating, to the first computing device via the BTLE connection, clock information associated with the second computing device, the clock information comprising a real-time piconet clock value of the second computing device for synchronization of a piconet clock associated with the first computing device.

14. A computing device comprising:
a Bluetooth module configurable for communication in accordance with a Bluetooth Classic (BTC) protocol or a Bluetooth Low Energy (BTLE) protocol;
and a processor in data communication with memory storing instructions that, when executed by the processor, cause the computing device to:
detect a trigger to establish a BTC connection with a second computing device, wherein a BTLE connection exists between the computing device and the second computing device; and
in response to the trigger:
communicate, to the second computing device via the BTLE connection, clock information associated with the computing device,
communicate, to the second computing device via the BTLE connection, a link layer (LL) BTC connection request,
receive, from the second computing device via the BTLE connection, a LL BTC response indicating whether the LL BTC connection request is accepted by the second computing device,
when the LL BTC connection request is accepted, establish the BTC connection with the second computing device, and
in response to a determination that switching from the BTLE connection to the BTC connection is not supported, using a BTC paging mechanism to establish the BTC connection.

15. The computing device of claim 14, wherein the clock information comprises a real-time piconet clock value of the computing device.

16. The computing device of claim 14, wherein the LL BTC connection request comprises a Bluetooth address (BD_ADDR) associated with the computing device and a logical Bluetooth Classic transport address (LT_ADDR) associated with the second computing device.

17. The computing device of claim 14, wherein the computing device determines that switching from the BTLE connection to the BTC connection is not supported based at least in part on receipt of a LL rejection message from the second computing device, the LL rejection message indicating that transport switching is not supported.

18. The computing device of claim 14, wherein the trigger to establish the BTC connection is generated in response to a determination that the BTC connection with a higher throughput than the BTLE connection is needed.

19. The computing device of claim 14, wherein execution of the instructions further causes the computing device to:
in response to the determination that switching from the BTLE connection to the BTC connection is not supported, send a Logical Link Control and Adaptation Protocol (L2CAP) message to the second computing device to modify page scan intervals to minimize BTC connection setup time.

* * * * *